United States Patent
Kondoh et al.

(10) Patent No.: US 11,359,665 B2
(45) Date of Patent: Jun. 14, 2022

(54) BALL JOINT AND METHOD OF MANUFACTURING BALL JOINT

(71) Applicant: MUSASHI SEIMITSU INDUSTRY CO., LTD., Toyohashi (JP)

(72) Inventors: Yasuhiro Kondoh, Toyohashi (JP); Ryoji Motomura, Toyohashi (JP); Frank Zill, Zwickau (DE)

(73) Assignee: Musashi Seimitsu Industry Co., Ltd., Aichi (JP)

( * ) Notice: Subject to any disclaimer, the term of this patent is extended or adjusted under 35 U.S.C. 154(b) by 105 days.

(21) Appl. No.: 15/931,992

(22) Filed: May 14, 2020

(65) Prior Publication Data
US 2020/0392984 A1 Dec. 17, 2020

(30) Foreign Application Priority Data

Jun. 13, 2019 (JP) .............................. JP2019-109991

(51) Int. Cl.
*F16C 11/06* (2006.01)

(52) U.S. Cl.
CPC ...... *F16C 11/0628* (2013.01); *F16C 11/0685* (2013.01); *Y10T 403/32778* (2015.01)

(58) Field of Classification Search
CPC .............. F16C 11/0628; F16C 11/0633; F16C 11/0638; F16C 11/0685; F16C 11/08; Y10T 403/32713; Y10T 403/32737; Y10T 403/32778
See application file for complete search history.

(56) References Cited

U.S. PATENT DOCUMENTS

| 3,329,454 A * | 7/1967 | Melton ............... F16C 11/0619 403/77 |
| 3,342,513 A * | 9/1967 | Melton ............... F16C 11/0619 403/77 |
| 5,885,022 A * | 3/1999 | Maughan ............ F16C 11/0642 403/135 |
| 10,047,788 B2 * | 8/2018 | Matsuura ............ F16C 11/0638 |
| 11,078,952 B2 * | 8/2021 | Sieve .................. F16C 11/0685 |

(Continued)

FOREIGN PATENT DOCUMENTS

| DE | 1796019 U | 9/1959 |
| DE | 19830593 C1 | 2/2000 |

(Continued)

OTHER PUBLICATIONS

Translation of EP 0 972 957. worldwide.espacenet.com. Oct. 29, 2021.*

(Continued)

*Primary Examiner* — Michael P Ferguson
(74) *Attorney, Agent, or Firm* — Carrier Blackman & Associates, P.C.; William D. Blackman; Joseph P. Carrier

(57) ABSTRACT

In the present invention, a housing includes a first opening in a first edge region facing a pin of a ball stud, the ball stud protrudes from the first opening, a gap is provided between an inner wall of a cavity and an outer wall of a bearing shell, a lining is injected into the gap, and the housing further includes a second opening in a second edge region opposite from the first opening for injecting the lining through the cavity, and one or more structural elements for clamping the lining to the inner wall of the second opening.

11 Claims, 11 Drawing Sheets

(56) References Cited

U.S. PATENT DOCUMENTS

2009/0279944 A1 11/2009 Schmitz et al.
2019/0291525 A1* 9/2019 Lee .................. B60G 7/005

FOREIGN PATENT DOCUMENTS

| DE | 298 19 498 | * | 4/2000 | ............. F16C 11/08 |
| DE | 10 2006 016 060 A1 | | 10/2007 | |
| DE | 10 2010 037 586 A1 | | 3/2011 | |
| DE | 20 2009 012 622 | * | 3/2011 | ............. F16C 11/06 |
| EP | 0860619 A1 | | 8/1998 | |
| EP | 0 972 957 | * | 7/1999 | ............. F16C 11/06 |
| EP | 0 971 138 | * | 2/2000 | ............. F16C 11/06 |
| WO | 1997/41361 A1 | | 11/1997 | |
| WO | 1999/09328 A1 | | 2/1999 | |
| WO | 1999/28639 A1 | | 6/1999 | |
| WO | 20000/26550 A1 | | 5/2000 | |

OTHER PUBLICATIONS

Office Action dated Nov. 18, 2021 in the corresponding German Patent Application No. 10 2019 116 034.0 with the English translation thereof.

* cited by examiner

BALL JOINT AND METHOD OF MANUFACTURING BALL JOINT

CROSS REFERENCE TO RELATED APPLICATION

The present application claims priority under to Japanese Patent Application No. 2019-109991 filed on Jun. 13, 2019, which is incorporated herein by reference.

BACKGROUND

The present disclosure relates to a ball joint and a method of manufacturing a ball joint.

Ball joints are used as a component of a body of an automobile (preferably a passenger car), for example.

A first technique includes a ball joint in which a ball stud is pivotally supported on a lining housed in a housing. In this technique, the lining is made of a heat-sensitive synthetic material and is molded between the ball stud and the housing by injection molding or casting.

A second technique includes a ball joint having a housing in which a bearing shell is made of plastic that is injected from an opening in the housing and cured, and in which a fixing means is integrally formed.

A third technique includes a ball joint having a housing including a cavity, an upper opening, and at least one inlet on the opposite side thereof. In this technique, a ball stud inserted through an upper opening of the housing is secured as centrally as possible in the cavity, after which a lining made of a polymeric plastic such as a thermoplastic resin is injected through the inlet.

A fourth technique includes a ball joint having a housing which accommodates a bearing shell in which a ball of a ball stud is supported. In this technique, after the ball stud is secured in place, an elastomer plastic made of a material with good sliding friction characteristics is injected into a gap between the housing and the ball to form the bearing shell.

A fifth technique includes a ball joint in which plastic is injected into a gap between a housing and a bearing shell in which a ball of a ball stud is rotatably housed, and the bearing shell is positioned in the housing together with the ball stud. In this techniques, the housing has an opening with a radius larger than the injected plastic so that the injected plastic covers the ball stud from the bottom of the housing. Further, the inner diameter is reduced toward the pin of the ball stud. The injection material protrudes from the opening of the housing in the direction of the ball stud to form a connection with a seal boot.

In the first technique, one or more recesses for securing the lining may be provided in the inner surface of the housing in order to prevent the lining from rotating within the housing. However, in the first technique, how to realize the recess is unknown. In the ball joint of the first technique, the diameter is reduced relatively sharply in the tensile direction (direction of the ball stud), which may cause the lining to break when pulled.

In the second technique, the inner wall of the housing is roughened or serrated to secure the bearing shell injected into the housing.

In the third technique, the inner wall of the housing or cavity has a rough surface or a raw surface made by cast, sheet metal forming, cold extrusion, or forging. Grooves/recesses may be added to this surface as needed. However, how to realize this rough or raw surface or groove/recess is unknown.

In the fourth technique, after the bearing shell and damping element are injected from the opening of the housing, a closing element made of a very hard and durable material is injected. A radially outward groove is provided inside the housing and the closing element is engaged therein. This groove is so sharp that large axial loads can break the closing element.

In the conventional method of positioning the ball stud in the housing by injecting the lining into the gap between the bearing shell and the housing as in the fifth technique, when a large axial force is applied to the ball stud, particularly at a high temperature of 80° C. or more, there is a risk that the clamp between the injected lining and the inside of the housing is disengaged and the lining is broken at a sharp edge inside the housing, resulting in malfunction of the ball joint.

It is an object of the present disclosure to provide a ball joint capable of being easily and inexpensively manufactured and withstanding a large load even at a high temperature, and a method of manufacturing the ball joint.

SUMMARY

According to one aspect, a ball joint includes a housing having a cavity for housing a ball of a ball stud, the ball being movably supported in a bearing shell, wherein the housing has a first opening in a first edge region facing a pin of the ball stud, the ball stud protrudes from the first opening, a gap is provided between an inner wall of the housing and an outer wall of the bearing shell, and a lining is injected into the gap, and wherein the housing further has a second opening for injecting the lining into the cavity in a second edge region opposite form the first opening, the ball joint further comprising one or more structural elements for clamping the lining to an inner wall of the second opening.

According to another aspect, a method of manufacturing the ball joint includes; forming one or more of the structural elements on the inner wall of the housing; fitting a subassembly comprising the ball stud and the bearing shell mounted on the ball into the housing before or after forming the structural element; and injecting the lining into a gap between the subassembly and the inner wall of the housing.

DETAILED DESCRIPTION

Figure 1:
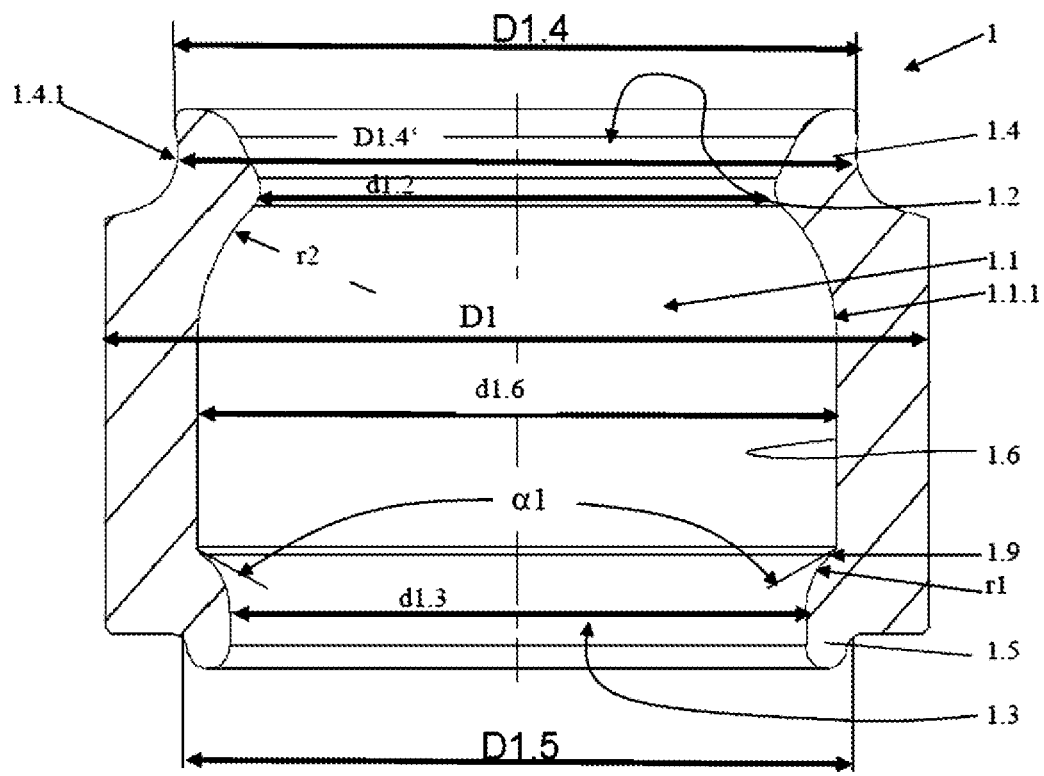
FIG. 1 is a longitudinal cross-sectional view of a housing in a first embodiment.

The techniques disclosed herein can be implemented, for example, in the following forms.

According to one aspect, a ball joint includes a housing having a cavity for housing a ball of a ball stud, the ball being movably supported in a bearing shell, wherein the housing has a first opening in a first edge region facing a pin of the ball stud, the ball stud protrudes from the first opening, a gap is provided between an inner wall of the housing and an outer wall of the bearing shell, and a lining is injected into the gap, and wherein the housing further has a second opening for injecting the lining into the cavity in a second edge region opposite form the first opening, the ball joint further comprising one or more structural elements for clamping the lining to an inner wall of the second opening.

Even if the second opening is larger than the outer diameter of the ball of the ball stud, this ball joint can withstand a large load applied to the ball stud even at a high temperature of 80° C. or more by clamping the injected lining to the inner wall of the housing.

Further, the structural element is preferably provided between the second opening for fitting a subassembly comprising the ball stud and the bearing shell attached to the ball into the housing and an equatorial region of the ball, and the second opening is larger than the first opening and larger than the outer diameter of the bearing shell.

In the ball joint, the structural element may particularly include the following structures a) to d) independently or in any combination.

a) At least a portion of the inner wall of the housing has a significant surface roughness or unevenness.
b) Volume (thickness) of the lining increases toward the second opening.
c) One or more grooves or recesses and/or knurling are formed in the inner wall of the housing independently or in any combination.
d) A step, connected to the second opening and extending radially in the direction of the first opening, is formed.

The arithmetic average roughness value Ra of the inner wall of the housing is preferably 10 µm or more and 75 µm or less, more preferably 10 µm or more and 63 µm or less.

The volume of the lining may increase toward the second opening so that the wall thickness is maximum in the region of the step. In other words, it becomes maximum in the first step.

In addition, in the inner wall of the housing, at least one spiral groove is formed, and/or a plurality of grooves or recesses are formed apart or crossing each other, and/or knurling are formed.

The housing may have a radially inwardly bent wall in a region of the second opening.

In a case that one or more grooves/recesses and/or knurling are formed in the inner wall of the housing, the depth thereof is preferably 0.3 mm or more and 1.5 mm or less, and they are preferably disposed in the region of the second opening.

The first edge region of the housing is formed in an axially extending protrusion shape, the second edge region of the housing is formed in an axially extending protrusion shape, and the lining covers the first edge region and/or the second edge region.

Preferably, the ball of the ball stud has a recess in a pole region and a projection of the bearing shell engages the recess. Thus, the bearing shell is securely attached to the ball of the ball stud. When the ball stud first pivots or swings after the ball joint is completed by injecting the lining, the projection engaging the recess of the ball breaks, allowing the ball to freely pivot within the bearing shell.

According to another aspect, a method of manufacturing the ball joint includes; forming one or more of the structural elements on the inner wall of the housing; fitting a subassembly comprising the ball stud and the bearing shell mounted on the ball into the housing before or after forming the structural element; and injecting the lining into a gap between the subassembly and the inner wall of the housing.

More preferably, before the ball stud is fitted into the housing and before the lining is injected, at least a portion of the inner wall of the housing is machined to provide significant surface roughness or unevenness, and/or the inner wall of the housing is machined to provide one or more grooves or recesses and/or knurling.

Further, the second opening of the housing is formed radially inwardly so as to connect with a step extending radially in the direction of the first opening.

One or more structural elements may be formed on the inner wall of the housing by a radial inward deforming method of swaging, folding, and upsetting.

A. First Embodiment

FIG. 1 shows a housing 1 of a ball joint. The housing 1 has a cavity 1.1 and two opposed openings of a first opening 1.2 and a second opening 1.3. The first opening 1.2 is formed in a first edge region 1.4 on the upper side in the figure of the housing 1, and the second opening 1.3 is formed in a second edge region 1.5 on the lower side in the figure. The housing 1 is formed by casting, sheet metal forming, cold extrusion, or forging, among others.

The first opening 1.2 on the upper side in the figure has an inner diameter d1.2 smaller than the inner diameter d1.3 of the second opening 1.3 on the lower side. A cylindrical portion 1.6 having a substantially cylindrical shape with an inner diameter d1.6 larger than d1.2 and d1.3 extends between the first opening 1.2 and the second opening 1.3.

The housing 1 has an outer diameter D1. The first edge region 1.4 has an outer diameter D1.4 smaller than the outer diameter D1, and the outer diameter D1.4 of the first edge region 1.4 is reduced to a slightly smaller reduced diameter D1.4' to form an undercut 1.4.1 in the outer contour of the first edge region 1.4. The lower second edge region 1.5 also has an outer diameter D1.5 smaller than the outer diameter D1.

Figure 2:
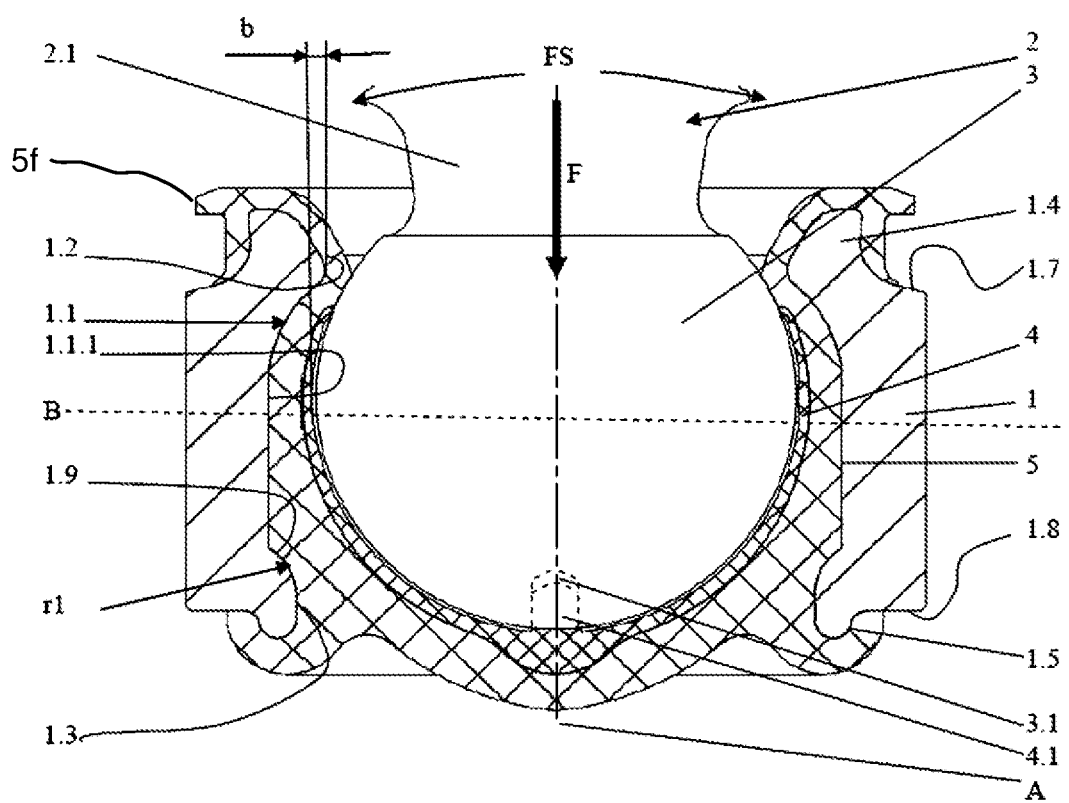
FIG. 2 is a longitudinal cross-sectional view of a ball joint comprising the housing of FIG. 1.

FIG. 2 shows a cross section of a ball joint passing through a ball stud 2 having a ball 3 rotatably housed in a bearing shell 4 and a housing 1 into which a lining 5 is injected. The longitudinal axis A of the ball stud 2 coincides with the longitudinal axis of the housing 1. The bearing shell 4 is housed in the housing 1 together with the ball 3 of the ball stud 2 (only partially illustrated here). The bearing shell 4 is preferably formed by molding POM (polyoxymethylene).

The lining 5 such as plastic, preferably PA (polyamide) is injected into a gap between the bearing shell 4 and the cavity 1.1 of the housing 1 so that the ball stud 2, housed in the bearing shell 4, is fixed in the housing 1. Furthermore, the lower surface of the bearing shell 4, the first edge region 1.4 protruding toward a pin 2.1 of the ball stud 2, and the second edge region 1.5 are overmolded by the lining 5. As seen in FIG. 2, the lining 5 is configured such that it covers a first axially outer face of the housing 1 proximate the first opening 1.2 (shown at the top of the drawing). In the depicted embodiment, the lining 5 also covers a second axially outer face of housing 1 proximate the second opening 1.3 (shown at the bottom of the drawing). The lining 5 extends to the periphery of the first edge region 1.4 and the undercut 1.4.1 (FIG. 1) to reach the radially outward first shoulder 1.7, and also extends to the periphery of the second edge region 1.5 to reach the radially outward second shoulder 1.8. Further in the depicted embodiment, the lining 5 also includes an integrally formed retaining flange 5f extending radially outwardly above the first shoulder 1.7 and proximate the first edge region 1.4.

The lower portion of the ball 3, a pole region (not shown), has a recess 3.1 with which a projection 4.1 of the bearing shell 4 is engaged. Therefore, when the subassembly comprising the bearing shell 4 and the ball stud 2 is fitted in the housing 1, the bearing shell 4 is surely positioned on the ball 3.

The projection 4.1 has a cutting portion (not shown). When a turning force FS is applied to the ball stud 2 after manufacturing the ball joint, the cutting portion is broken and the ball 3 of the ball stud 2 can freely turn in the bearing shell 4. At this time, the projection 4.1 remains in the recess 3.1.

The subassembly comprising the ball stud 2 and the bearing shell 4 is fitted into the housing 1 from the lower second opening 1.3 to a desired position, with the pin 2.1 protruding from the first opening 1.2. For assembly purposes, the inner diameter d1.3 of the second opening 1.3 of the housing 1 must be slightly larger than the outer diameter of the bearing shell 4. The housing 1 may be configured such that the second opening 1.3 is on the top and the first opening 1.2 is on the bottom. In this case, the ball stud 2 is fitted into the housing 1 with the pin 2.1 facing downward.

The inner wall 1.1.1 of the housing 1 has, as a first structural element (structure a as earlier described herein), a surface roughness/unevenness (arithmetic mean roughness value) of Ra of 10 μm or more and of 63 μm or less. The surface roughness/unevenness provides a first example of a textured surface and is preferably formed by lathe machining. This significant surface roughness/unevenness may be present in the cylindrical portion 1.6 and/or the first opening 1.2 and/or the second opening 1.3, or may be present throughout the inner wall 1.1.1 of the housing 1.

Here, the first structural element is combined with a fourth structural element (structure d as earlier described herein), and the fourth structural element is connected to the second opening 1.3 of the housing 1, and is formed as a first step 1.9 in a shape expanding in the radial direction at a first angle α1 of 100° or more and 130° or less (see FIG. 1) in the direction of the first opening 1.2. The first step 1.9 has a convex curved part having a relatively large first radius r1. The first radius r1 is preferably 1.0 to 6 mm, more preferably 2.0 to 4 mm.

Oppositely, in the direction of the first opening 1.2, there is a concave curved part having a second radius r2 (see FIG. 1), with the second radius r2 preferably 4 to 12.5 mm, and more preferably 6 to 10 mm. Thus, the inner diameter of the inner wall 1.1.1 of the housing 1 is reduced from the diameter d1.6 to the diameter d1.2 of the first opening part 1.2.

The inner diameter d1.2 is set such that there is an overlap b between the inner diameter d1.2 and the outer diameter of the ball 3 (see FIG. 2) in the pulling direction, that is, in the direction of the pin 2.1, so that it can withstand a great load in the pulling direction.

According to the newly designed internal structure of the housing 1, even if there is no overlap between the diameter d1.3 of the second opening part 1.3 of the housing 1 and the outer diameters of the ball 3 and the bearing shell 4, the ball joint can withstand relatively large axial force/push-out force F (see FIG. 2) in the push-out direction of the ball stud 2, so that the ball joint can be prevented from being damaged even at a high temperature of 80° C. or more. The injected lining 5 ensures good clamping or gripping with the inner wall 1.1.1 due to the significant surface roughness/unevenness of the inner wall 1.1.1 of the housing 1. Further, the first step 1.9 having the convex curved portion allows the lining 5 to withstand a great amount of axial force F without causing displacement or breakage. Designing the first step 1.9 arranged between the equatorial region B of the ball 3 and the second opening part 1.3 in this way increases resistance to the axial force F of the ball stud 2 and the lining 5 and prevents breakage of the lining 5.

B. Second Embodiment

Figure 3:
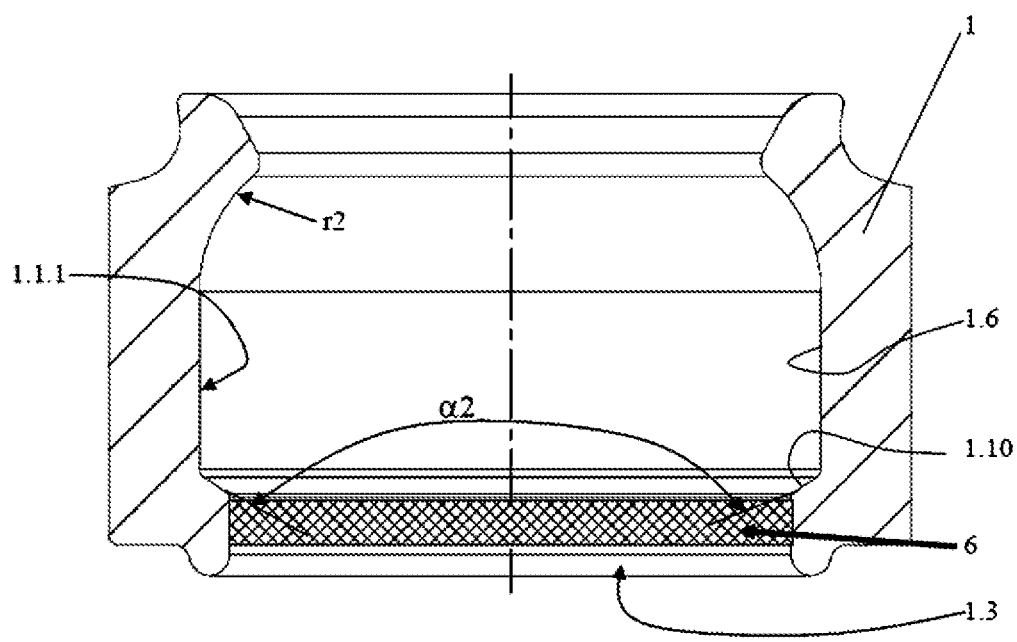
FIG. 3 is a longitudinal cross-sectional view of a housing in a second embodiment.
Figure 4:
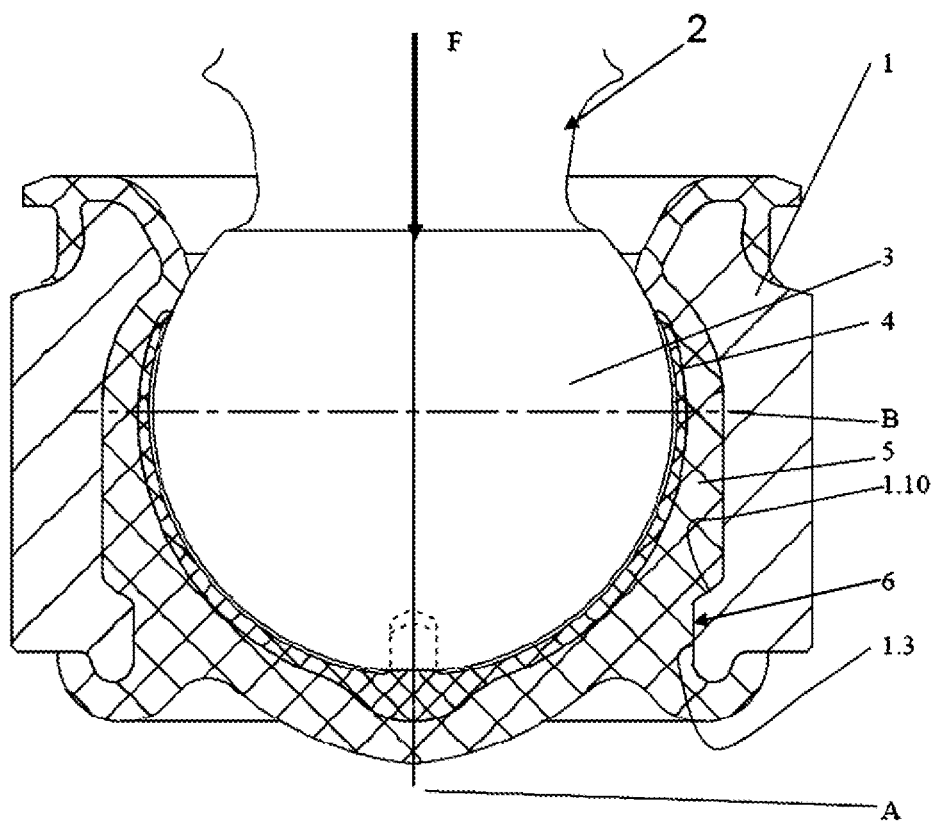
FIG. 4 is a longitudinal cross-sectional view of a ball joint comprising the housing of FIG. 3.

FIG. 3 shows a longitudinal cross-sectional view of a housing 1, and FIG. 4 shows a ball joint comprising the housing 1 of FIG. 3. These are basically equivalent to the embodiment of FIGS. 1 and 2. The difference from the embodiment of FIGS. 1 and 2 is that the housing 1 has a second step 1.10, preferably having an angle α2 that is 95° or more and 125° or less, whereby the inner diameter of the housing 1 is reduced from the inner diameter d1.6 of the cylindrical portion 1.6 to the diameter d1.3 of the second opening 1.3 to form a fourth structural element (structure d as earlier described herein) disposed between the equatorial region B of the ball 3 and the second opening 1.3 (see FIG. 4).

The housing 1 further includes a third structural element (structure c as earlier described herein) of knurling 6 provided in the second opening 1.3. Therefore, the housing 1 of this embodiment is provided with two structural elements, the third structural element and the fourth structural element. This knurling 6 provides a second example of a textured surface which may be provided on the inner wall of the housing. However, it is also possible to provide only one of these structural elements, i.e., only one of the third and fourth structural elements, or to combine both the third and fourth structural elements with the significant surface roughness/unevenness (see FIGS. 1 and 2) as the first structural element (structure a as earlier described herein). The second step 1.10 acts to prevent or delay the push-out and/or breakage of the lining 5 when an axial/push-out force F is applied to the ball 3 of the ball stud 2 in the direction of the second opening 1.3 (see FIG. 4), thereby preventing or delaying the push-out of the ball stud 2 together with the bearing shell 4 even at high temperatures. The presence of the knurling 6 in the second opening 1.3 further clamps the lining 5 and thus can withstand greater axial force F.

The knurling 6 (third structural portion) may be disposed at different positions or may extend over the entire inner wall 1.1.1 of the housing 1.

Also in FIG. 4, as in the embodiment of FIG. 2, the longitudinal axis A of the ball stud 2 coincides with the longitudinal axis of the housing 1.

C. Third Embodiment

Figure 5:
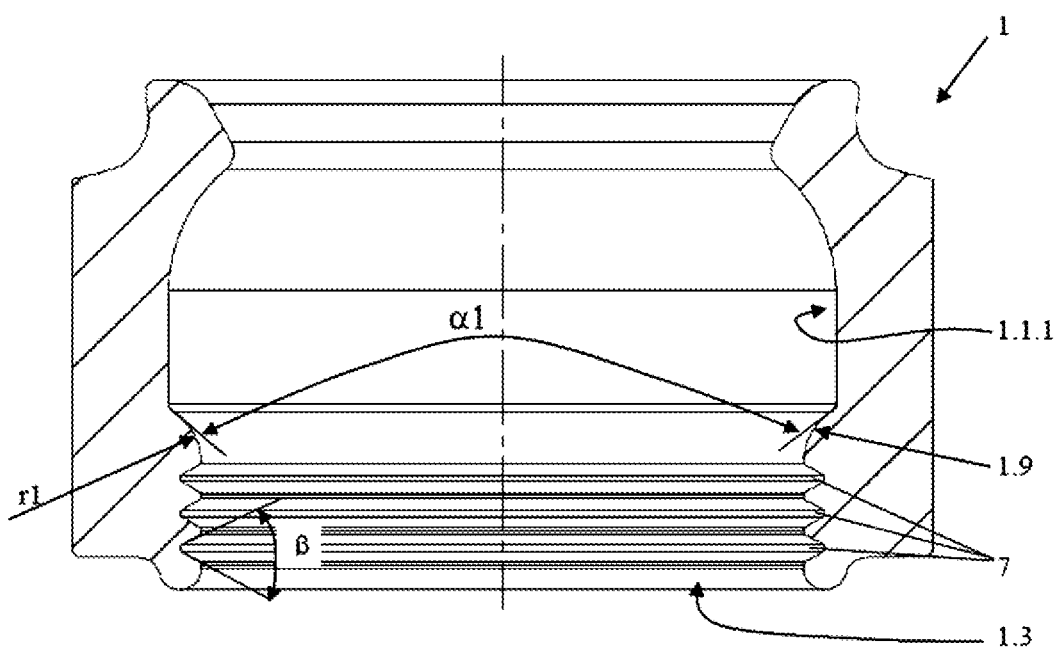
FIG. 5 is a longitudinal cross-sectional view of a housing in a third embodiment.
Figure 6:
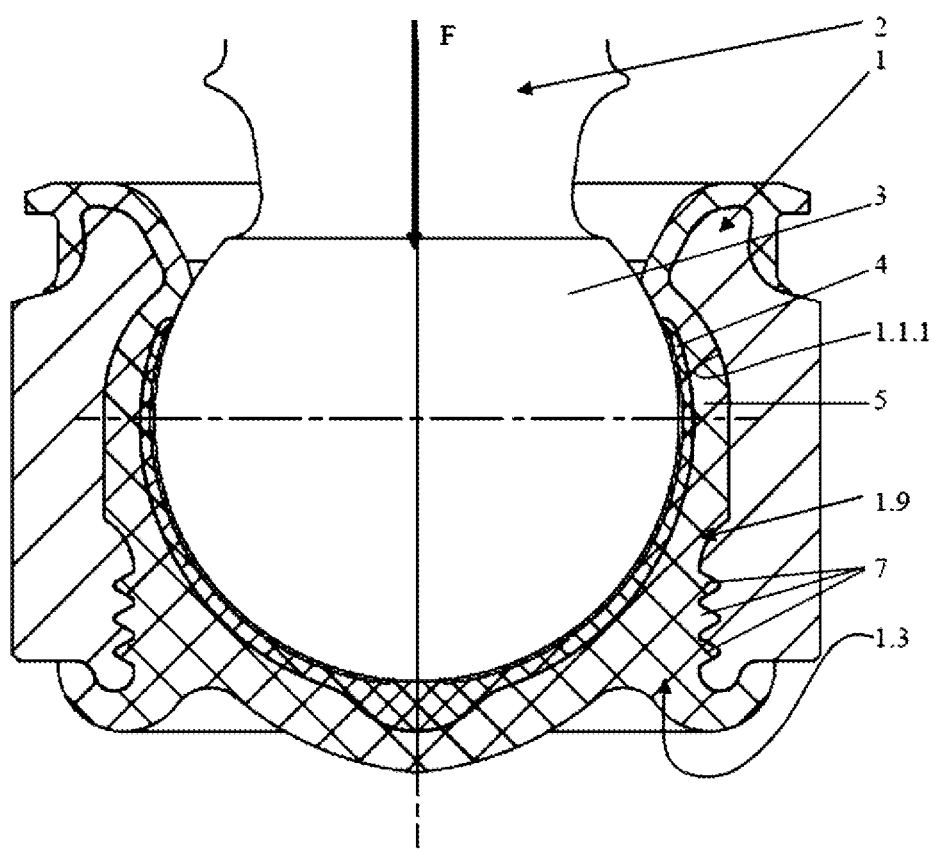
FIG. 6 is a longitudinal cross-sectional view of a ball joint comprising the housing of FIG. 5.

FIG. 5 shows a longitudinal cross-sectional view of a housing 1, and FIG. 6 shows a ball joint comprising the housing 1 of FIG. 5. These are basically equivalent to the embodiments of FIGS. 1 and 2. The difference from the embodiment of FIGS. 1 and 2 is that the housing 1 has a plurality of grooves 7 (here, three circumferential grooves 7) as a third structural element (structure c as earlier described herein). These grooves 7 provide a third example of a textured surface which may be provided inside of the housing, and are provided in the second opening 1.3 in this embodiment. The flank angle β of the groove 7 is preferably 50° or more and 70° or less, particularly 60°.

Here, the third structural element is combined with the first step 1.9 (fourth structural portion). As in FIGS. 1 and 2, the first step 1.9 is connected to the second opening 1.3 of the housing 1, and is formed in a shape expanding in the radial direction at a first angle α1 (see FIG. 5) of 95° or more and 125° or less (see FIG. 1), preferably 110° in the direction of the first opening 1.2. The first step 1.9 has a convex curved part having a relatively large first radius r1. The first radius r1 is preferably 1.0 to 6 mm, more preferably 2.0 to 4 mm.

Further, as in FIGS. 1 and 2, a significant surface roughness/unevenness (not shown) as a first structural element (structure a as earlier described herein), which may be provided over a part or the whole area of the inner wall 1.1.1 of the housing 1.

The first step 1.9 acts to prevent or delay the push-out and/or breakage of the lining 5 when an axial force/push-out force F is applied to the ball 3 of the ball stud 2 in the direction of the second opening 1.3 (see FIG. 6), thereby preventing or delaying the push-out of the ball stud 2 with the bearing shell 4 even at high temperatures.

The presence of the plurality of grooves 7 in the second opening 1.3 further clamps the lining 5 and thus can withstand a greater axial force F.

D. Modifications

The techniques disclosed herein are not limited to the embodiments described above, but may be modified in various forms without departing from the spirit thereof, so that the modifications such as the followings are possible.

As an unillustrated embodiment, a threaded spiral groove may be provided instead of the plurality of grooves 7.

The housing 1 shown in FIGS. 1 to 6 can be manufactured by extrusion, swaging, or casting, among others, in combination with machining to form structural elements on the inner wall 1.1.1.

As a further embodiment of the present invention, after the ball stud 2 is secured together with the bearing shell 4 within the housing 1 by the lining 5, one or both ends of the housing 1 may be radially inwardly deformed.

Figure 7:
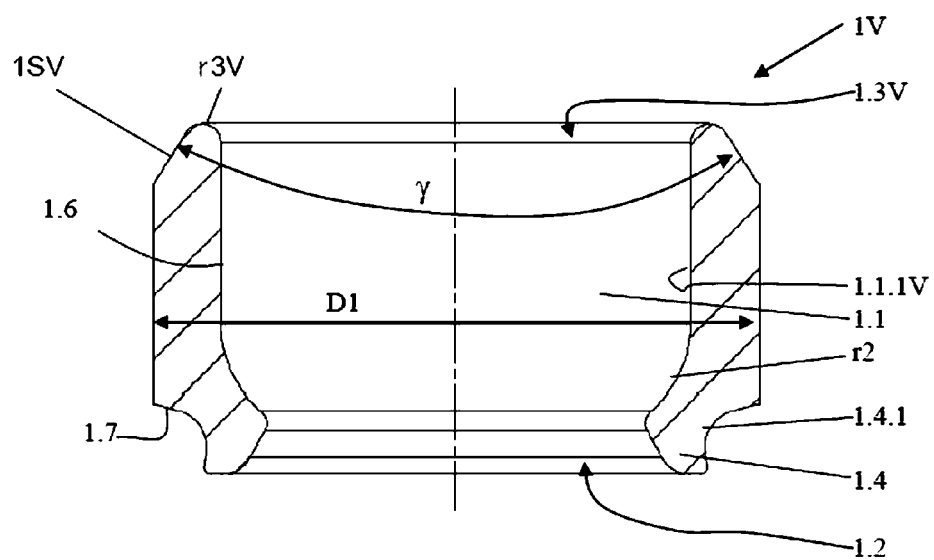
FIG. 7 is a longitudinal cross-sectional view of a housing preform.

FIG. 7 is a longitudinal sectional view of the preform 1V of the housing 1. The preform 1V is formed in a substantially cylindrical shape, and has a cavity 1.1 and a first opening 1.2 provided in the first edge region 1.4 on the lower side in the figure, and an undercut 1.4.1 is provided on the outer periphery of the first edge region 1.4 (similar to the housing 1 embodiments of FIGS. 1 to 6). The inside of the first opening 1.2 is connected to the second radius r2, and the second radius r2 is preferably 5 to 12 mm, more preferably 6 to 9 mm, as in the above-described embodiments of the housing 1. The second radius r2 is connected to the cylindrical portion 1.6 extending to an opening 1.3V on the opposite side of the preform 1V. Outside the second radius r2, a first shoulder 1.7 is connected to the undercut 1.4.1 of the first edge region 1.4. Next to the first shoulder 1.7, an outer diameter D1 substantially corresponding to the outer diameter of the final housing 1 extends in the direction of the opening 1.3V. The outer contour of the preform 1V is then reduced from the outer diameter D1 by the presence of the slope 1SV having an angle γ of, for example, preferably 20° or more and 90° or less, particularly 30° or more and 60° or less, toward the opening 1.3V. The end face has a third radius r3V of 0.3 mm or more and 3 mm or less.

After fitting the subassembly comprising the ball stud 2 and the bearing shell 4 from the opening 1.3V and positioning the ball 3 together with the bearing shell 4 in the cavity 1.1, the region opposite to the first opening 1.2 of the preform 1V is deformed radially inward.

Figure 8:
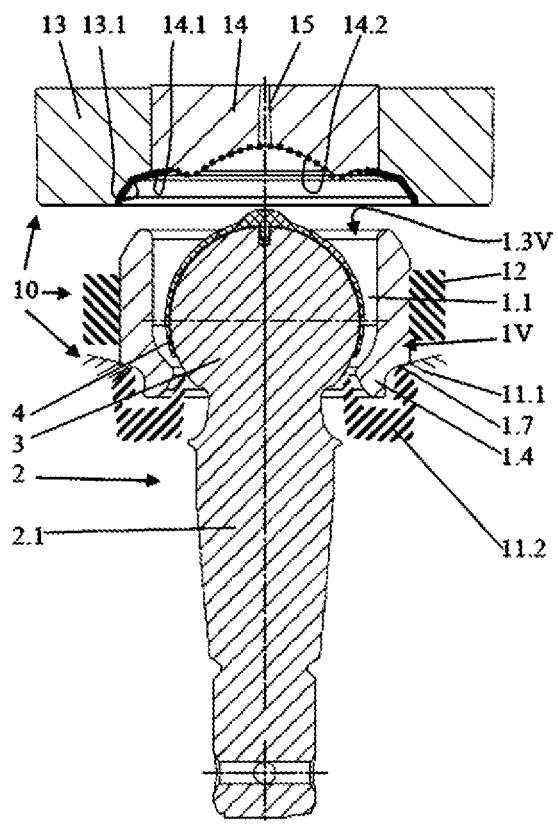
FIG. 8 shows a preform fitted into a forming die together with a subassembly including a ball stud and a bearing seat.

FIG. 8 shows the preform 1V of the housing 1 fitted into a forming die 10 with the subassembly comprising the ball stud 2 and the bearing shell 4 attached to the ball 3. In this case, since the ball 3 is housed in the cavity 1.1 of the preform 1V together with the bearing shell 4, a gap is formed between the inner wall 1.1.1V of the preform 1V, and the outer contour of the bearing shell 4 and the portion of the ball 3 protruding from the bearing shell 4. Only the pole region (not shown) of the bearing shell 4 and the ball 3 slightly protrudes from the end face side region of the opening 1.3V. The ball stud 2 with the bearing shell 4 attached to the ball 3 is fitted into the cavity 1.1 of the preform 1V from the opening 1.3V together with the pin 2.1. The forming die 10 has a first lower body 11.1, and the first shoulder 1.7 of the preform 1V is placed on the first lower body 11.1 and supported at the time of deforming. A second lower body 11.2 (which may be formed of multiple parts in slider form) arranged inside in the radial direction of the first lower body 11.1 forms a gap for the lining 5 in the direction of the pin 2.1 of the ball stud 2 and away from the first edge part 1.4. The substantially cylindrical outer periphery of the preform 1V is fixed by an annular support 12. Further, an upper body of a two-part structure comprising a first upper body 13 and a second upper body 14 disposed therein is provided in an open state still at this time. The first upper body 13 has a first forming contour 13.1 indicated here by a thick line facing the preform 1V. The second upper body 14 also has a second forming contour 14.1 indicated by a thick line outside in the radial direction facing the preform 1V. The first forming contour 13.1 and the second forming contour 14.1 are adjacent to each other as shown in FIG. 8. The second upper body 14 further includes, on the side of the ball stud 2, a forming contour 14.2, shown here in bold dashed lines, and an inlet 15 for injecting the lining 5.

After the subassembly comprising the ball stud 2 and the bearing shell 4 is fitted into the forming die 10 of FIG. 8, the first and second upper bodies 13, 14 are moved together toward the first and second lower bodies 11.1, 11.2 to close the forming die 10 while applying deforming force by which the preform 1V is radially inwardly deformed by the forming contours 13.1, 14.1 in the region facing the first and second upper bodies 13, 14. In this deforming process, a slope 1SV (see FIG. 7) of the preform 1V advantageously works.

Figure 9:
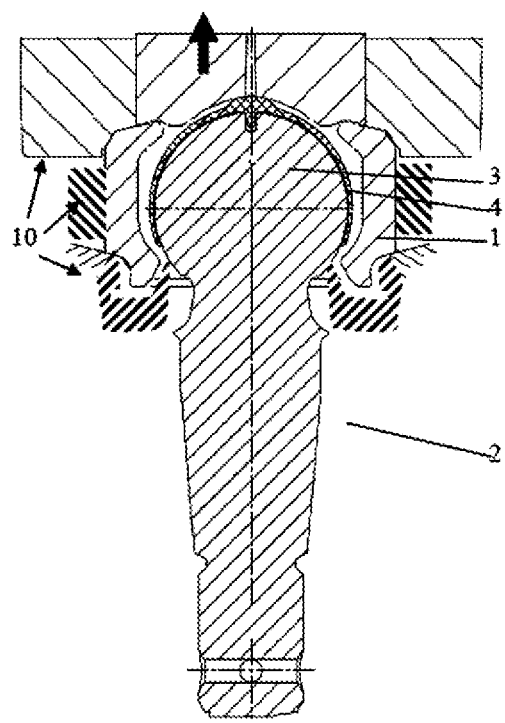
FIG. 9 shows a housing deformed by a forming die.

FIG. 9 shows the housing 1 deformed from a preform 1V in a forming die 10 together with the ball stud 2 having the ball 3 attached with the bearing shell 4.

Figure 10:
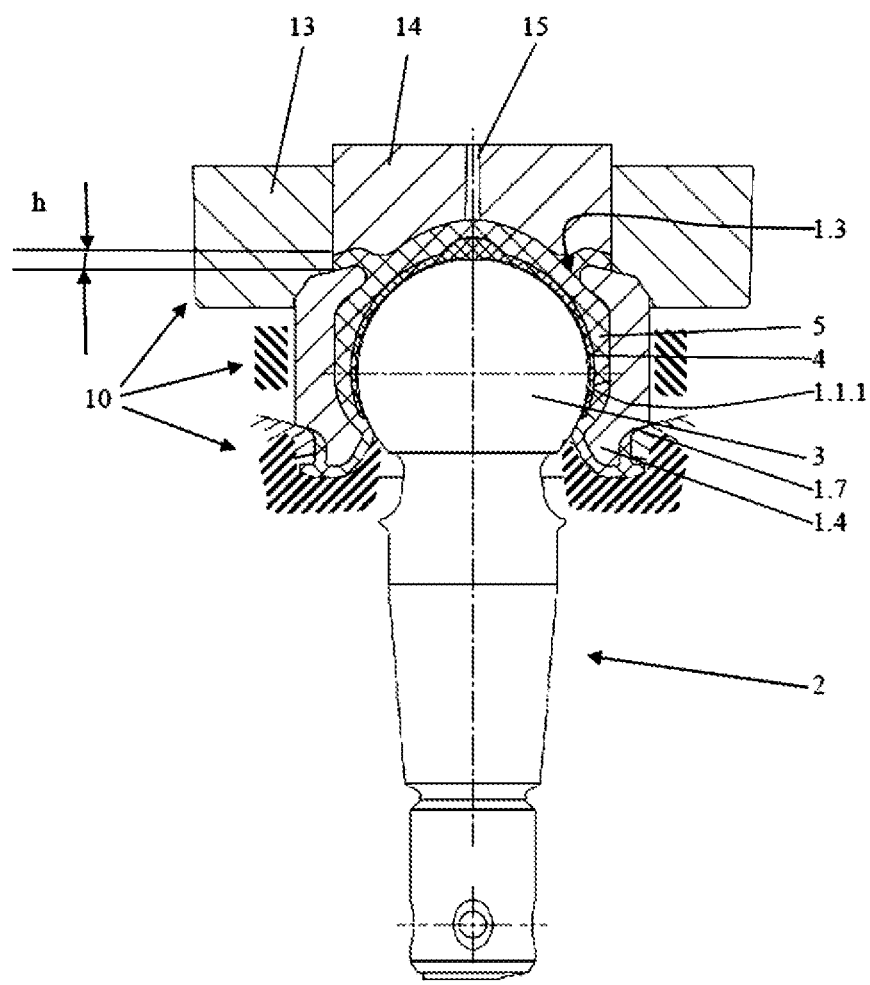
FIG. 10 shows a housing after injecting the lining.

In order to overmold the radially inwardly formed region, the second upper body 14 is moved in the direction of the thick arrow (see FIG. 9) relative to the first upper body 13, so that the forming contours 13.1, 14.1 which had been adjacent to each other are separated from each other by a dimension h (see FIG. 10). A significant advantage here is that the deformed region can spring back. Consequently, stress does not act on the lining 5 after the forming die 10 is opened.

Thereafter, as shown in FIG. 10, the lining 5 is injected into the cavity 1.1 (see FIG. 9) through the inlet 15. The cavity 1.1 is formed between the bearing shell 4/ball 3 and the inner wall 1.1.1 of the housing 1 and between the forming contour of the forming die 10 and the housing 1. In this case, the forming contour 14.1 of the second upper body 14 forms, together with the contour 14.2, a molding contour for injection molding. The lining 5 fixes the ball 3 of the ball stud 2 fitted with the bearing shell 4 into the housing 1, and the first edge region 1.4 is overmolded to the shoulder 1.7. Further, the polar region of the bearing shell 4 is overmolded, and the region formed radially inwardly of the second opening 1.3 of the housing 1 is also overmolded.

Figure 11:
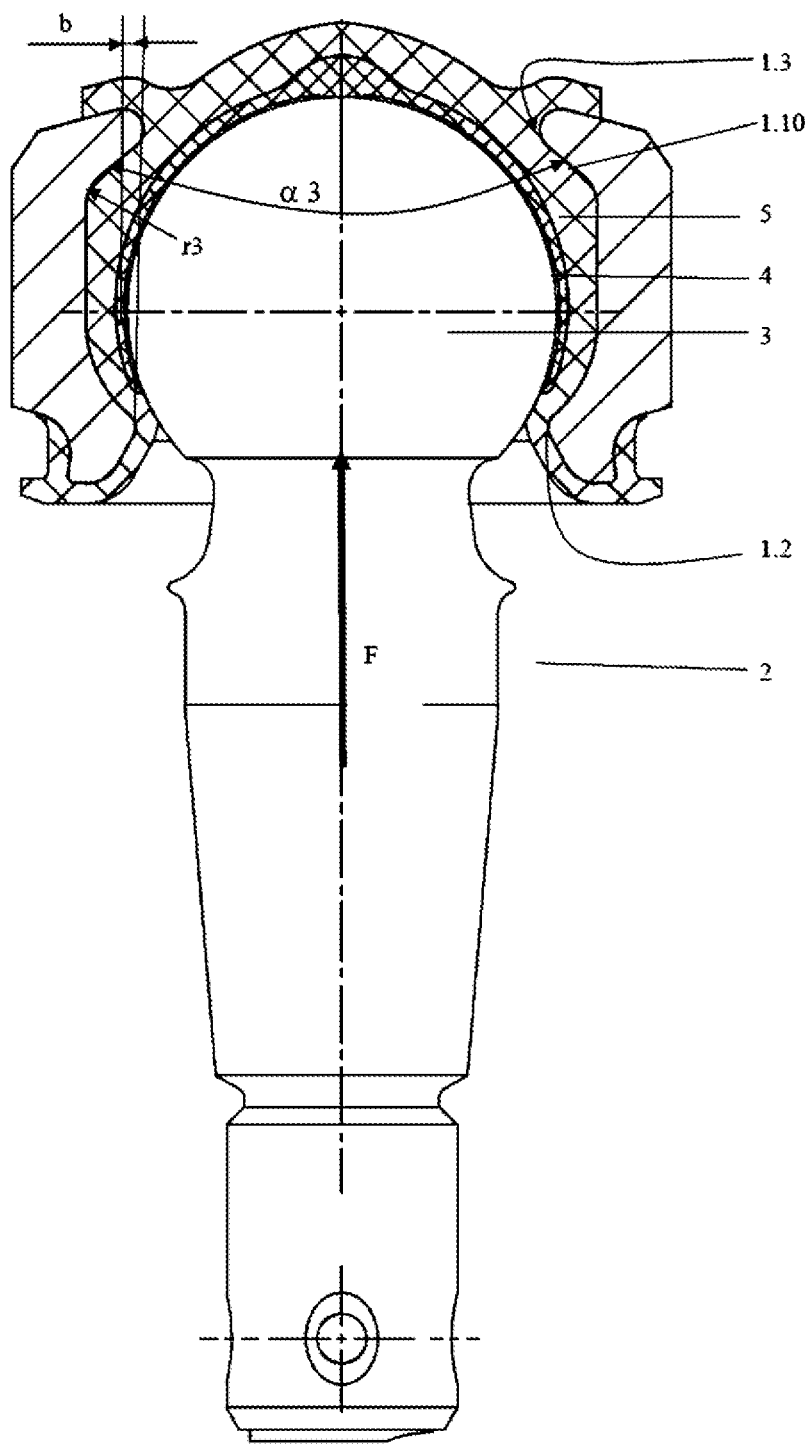
FIG. 11 shows a ball joint after removal from a forming die.

FIG. 11 shows the ball joint after being pulled out of the forming die 10. Via radially inwardly formed region of the second opening 1.3, the second opening 1.3 of the housing 1 is connected with a second step 1.10 having a third angle α3, preferably between 80° or more and 140° or less. The second step 1.10 is followed by a concave third radius r3 (2 mm or more and 9 mm or less), and the third radius r3 is transit to the inner diameter d1.6 of the cylindrical portion 1.6 of the cavity 1.1 of the housing 1. Here, the second step 1.10 acts as a fourth structural element (structure d as earlier described herein), and prevents breakage of the lining 5 and disengagement of the ball stud 2 together with the ball 3 and the bearing shell 4 to break the ball joint when the axial force/push-out force F is applied.

By inserting the ball stud 2 into a large opening 1.3V (see FIG. 7) together with the bearing shell 4 attached to the ball 3 and then deforming the opening radially inward, the second opening 1.3 of the housing 1 after being radially inward deformed becomes smaller than the outer diameter of the ball 3, so that an overlap b is caused between both the first opening 1.2 and the second opening 1.3 of the housing 1 and the outer diameter of the ball 3, thereby preventing disengagement of the ball 3 from the housing 1.

In addition, as an embodiment not shown in figures, a significant surface roughness/unevenness (structure a as earlier described herein) and/or grooves/recesses and/or knurling (structure c as earlier described herein) may be provided inside the preform 1V of the housing 1 prior to deforming.

In addition to the embodiments shown and described above, the structural portions of the housing 1 may be optionally combined with each other.

According to the above embodiment, the structural portions of the housing 1 ensures excellent clamping of the lining 5 and the housing 1, so that the ball joint can withstand a high temperature region of 80° C. or higher.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A ball joint comprising a housing having a cavity formed therein extending between opposing first and second outer faces of the housing, and housing a ball of a ball stud, the ball being movably supported in a bearing shell encompassing the ball, wherein the housing has a first opening to the cavity in a first edge region facing a pin of the ball stud, the first edge region comprising an annular lip axially protruding from the first outer face and surrounding the first opening, wherein the ball stud protrudes from the first opening, a gap is provided between an inner wall of the housing and an outer wall of the bearing shell, and a lining is injected into the gap, wherein the housing further has a second opening to the cavity in a second edge region opposite from the first opening, the second edge region comprising an annular lip axially protruding from the second outer face and surrounding the second opening, the second opening having a cylindrical inner surface continuously connected to the second edge region and having a width perpendicular to the axial direction, the width of the second opening being larger than an outer diameter of the bearing shell, and wherein the lining is injected through the second opening into the cavity, the ball joint further comprising a plurality of structural elements for clamping the lining to an inner wall of the second opening, said structural elements comprising a step, connected to the second opening and extending radially and axially in a direction of the first opening, and at least one textured surface portion of the inner wall of the housing, the textured surface portion including at least one feature selected from the group consisting of grooves, knurling, and a surface roughness or unevenness having an arithmetic average roughness value Ra in a range between 10 μm and 75 μm, the textured surface portion disposed on the cylindrical inner surface of the second opening, wherein the lining fills the gap between the inner wall of the housing and the outer wall of the bearing shell, and the lining wraps around the first and second edge regions to the first and second outer faces of the housing.

2. The ball joint according to claim 1, wherein a thickness of the lining increases toward the second opening.

3. The ball joint according to claim 2, wherein the thickness of the lining increases toward the second opening so that the wall thickness is maximum in the region of the step.

4. The ball joint according to claim 1, wherein the textured surface portion of the inner wall of the housing comprises a surface roughness having an arithmetic average roughness value Ra of 10 μm or more and 63 μm or less.

5. The ball joint according to claim 1, wherein, in the inner wall of the housing, at least one spiral groove is formed, and/or a plurality of grooves or recesses are formed apart or crossing each other, and/or knurling are formed.

6. The ball joint according to claim 5, wherein, in a region of the second opening, one or more grooves or recesses and/or knurling are formed and the depth of the grooves or recesses and/or knurling is 0.3 mm or more and 1.5 mm or less.

7. The ball joint according to claim 1, wherein the housing has a radially inwardly bent wall in a region of the second opening.

8. The ball joint according to claim 1, wherein the ball of the ball stud has a recess in a pole region and a projection of the bearing shell engages the recess.

9. The ball joint according to claim 1, wherein the lining further comprises an integrally formed retaining flange extending radially outwardly thereon proximate the first edge region.

10. A ball joint comprising a housing having a cavity formed therein extending between opposing first and second outer faces of the housing, and housing a ball of a ball stud, the ball being movably supported in a bearing shell encompassing the ball, wherein the housing has a first opening to the cavity in a first edge region facing a pin of the ball stud, the first edge region comprising an annular lip axially protruding from the first outer face and surrounding the first opening, wherein the ball stud protrudes from the first opening, a gap is provided between an inner wall of the housing and an outer wall of the bearing shell, and a lining is injected into the gap, wherein the housing further has a second opening to the cavity in a second edge region opposite from the first opening, the second edge region comprising an annular lip axially protruding from the second outer face and surrounding the second opening, the second opening being larger than an outer diameter of the bearing shell, and wherein the lining is injected through the second opening into the cavity, the ball joint further comprising a plurality of structural elements for clamping the lining to an inner wall of the second opening, said structural elements comprising a step, connected to the second opening and extending radially and axially in a direction of the first opening, and at least one textured surface portion of the inner wall of the second opening, the textured surface portion including at least one feature selected from the group consisting of grooves, knurling, and a surface roughness or unevenness having an arithmetic average roughness value Ra in a range between 10 μm and 75 μm, wherein the lining fills the gap between the inner wall of the housing and the outer wall of the bearing shell, and the lining wraps around the first and second edge regions to the first and second outer faces of the housing.

11. The ball joint according to claim 10, wherein the lining further comprises an integrally formed retaining flange extending radially outwardly thereon proximate the first edge region.

\* \* \* \* \*